United States Patent
Wood et al.

(10) Patent No.: US 9,227,298 B2
(45) Date of Patent: Jan. 5, 2016

(54) SAW BLADE SHARPENING APPARATUS

(71) Applicant: Kimberly-Clark Worldwide, Inc., Neenah, WI (US)

(72) Inventors: James Larry Wood, Beggs, OK (US); Bernard Justin King, Tulsa, OK (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 92 days.

(21) Appl. No.: 14/169,957

(22) Filed: Jan. 31, 2014

(65) Prior Publication Data
US 2015/0217426 A1 Aug. 6, 2015

(51) Int. Cl.
*B24B 49/00* (2012.01)
*B24B 49/18* (2006.01)
*B24B 3/36* (2006.01)
*G01H 1/00* (2006.01)

(52) U.S. Cl.
CPC ............... *B24B 49/003* (2013.01); *B24B 3/36* (2013.01); *B24B 49/18* (2013.01); *G01H 1/00* (2013.01)

(58) Field of Classification Search
CPC ............................ B24B 49/003; B24B 49/00
USPC .............................................. 451/5, 8, 9, 100
See application file for complete search history.

(56) References Cited

U.S. PATENT DOCUMENTS

| | | | | |
|---|---|---|---|---|
| 3,089,561 A * | 5/1963 | Michael et al. | | 73/648 |
| 3,201,776 A * | 8/1965 | Morrow et al. | | 340/683 |
| 3,704,557 A * | 12/1972 | Peonski | | 451/9 |
| 3,802,535 A * | 4/1974 | Peake et al. | | 73/646 |
| 3,829,750 A | 8/1974 | Centner et al. | | |
| 4,173,846 A | 11/1979 | Steiner et al. | | |
| 4,302,977 A * | 12/1981 | Sisson et al. | | 73/658 |
| 4,347,771 A | 9/1982 | Bradley | | |
| 4,584,917 A | 4/1986 | Blom | | |
| 4,604,834 A | 8/1986 | Thompson | | |
| 4,658,245 A * | 4/1987 | Dye et al. | | 340/683 |
| 4,821,613 A | 4/1989 | Hertel | | |
| 5,152,203 A | 10/1992 | Wierschke | | |
| 5,924,346 A | 7/1999 | Wunderlich et al. | | |
| 6,085,121 A | 7/2000 | Stern | | |
| 6,224,468 B1 | 5/2001 | Blume et al. | | |
| 7,021,142 B2 * | 4/2006 | Roark | | 73/585 |
| 2005/0244013 A1 * | 11/2005 | Battenberg et al. | | 381/57 |
| 2012/0184186 A1 | 7/2012 | Graham, Jr. et al. | | |

* cited by examiner

*Primary Examiner* — Robert Rose
(74) *Attorney, Agent, or Firm* — Kimberly-Clark Worldwide, Inc.

(57) ABSTRACT

The present invention provides a sound level meter that may be removably coupled to a saw blade sharpening apparatus to aid in safe, reliable, reproducible and effective saw blade sharpening. The sound level meter is adapted to be removably attached to the saw blade sharpening apparatus and to provide accurate and reliable indication of interference between the saw blade and the saw blade sharpening stones. The sound level meter is capable of detecting interference even in the often noisy operating environment.

14 Claims, 3 Drawing Sheets

SAW BLADE SHARPENING APPARATUS

BACKGROUND

Consumer sized rolls of paper products such as paper toweling, bathroom tissue, and the like are frequently prepared by rolling paper stock into relatively wide rolls having a diameter in the range of 4-12 inches. These rolls are referred to as "logs" in the industry, and are subsequently cut into lengths of 4-12 inches to produce a consumer unit of product. In other instances, the stock is folded into elongated bodies having a square cross-section corresponding to folded paper towels. These bodies are also called "logs" and, like the circular cross-section logs, they are subsequently cut into various lengths. In either instance, this cutting is accomplished through the use of large, circular knife edged blades referred to as "log saw blades." These blades have a diameter typically in excess of 2 feet, and are required to have a very sharp edge so as to effectively cut the logs. The paper product dulls the knife edged blades very quickly; hence, they must be sharpened frequently. It is preferable that the sharpening process not require removal of the blade from the log saw apparatus so as to minimize downtime, and it is most preferable that the sharpening operation may be carried out while the blade is in use.

The prior art has implemented a number of systems which operate to contact a moving, circular, knife edged blade with one or more stationary or moving sharpening stones. Commonly employed prior art systems operate to contact the blade with spring-loaded abrasives which push the blade from one direction and pull it from another. These systems however, require the operator to manually adjust sharpening stones while visually inspecting, and listening by ear, to confirm the proper degree of interference between stone and blade. This type of inspection and set-up is difficult in the often noisy mill environment and in presence of various guards and shields that protect the operator from the rotating blade.

Thus, there is a need for a system for setting up and sharpening circular knife edged blades, such as log saw blades, which system eliminates the problems of the prior art. It is further desirable that any such blade sharpening system be amenable to rapid and precise readjustment and may be readjusted consistently by a wide range of users.

SUMMARY

The present invention provides a system for sharpening circular knife edged blades, such as log saw blades, which eliminates or greatly minimizes variability in the setup of the sharpening apparatus, while maintaining or improving operator safety. The system of the present invention may be utilized while the blade is in service with safety mechanisms and protections in place, providing safe and accurate adjustment by a user. In this manner the system minimizes the chance of injury to a user while maximizing the operational time of the sharpening system.

Accordingly, in one embodiment the present invention provides a sound level meter that may be removably mounted to a blade sharpening apparatus, the sound level meter comprising a housing; a microphone; a processor coupled to the microphone; a display coupled to the processor; and a mounting mechanism for removably mounting the sound level meter to a blade sharpening apparatus.

In still other embodiments the present invention provides a sound level meter that may be removably mounted to a blade sharpening apparatus, the sound level meter comprising a housing; a microphone; a microphone shield; a processor coupled to the microphone; a display coupled to the processor; and a magnet for removably mounting the sound level meter to a blade sharpening apparatus, wherein the microphone and the magnet lie substantially in the same plane.

In another embodiment the present invention provides a method of sharpening a saw blade comprising the steps of providing a saw blade sharpening apparatus comprising a saw blade, a saw blade guard and at least one sharpening stone; providing a mountable sound level meter; mounting the sound level meter on the saw blade sharpening apparatus; and adjusting the position of the sharpening stone until the sound meter detects interference between the blade and the stone.

In yet other embodiments the present invention provides a method of sharpening a saw blade comprising the steps of providing a saw blade sharpening apparatus comprising a saw blade, a first and a second sharpening stone, a saw blade guard and a frame; providing a mountable sound level meter comprising a microphone, a housing, a display and a magnet; magnetically mounting the sound level meter on the saw blade guard; a adjusting the position of the first sharpening stone until the sound meter detects interference between the saw blade and the first sharpening stone; a adjusting the position of the first sharpening stone until the sound meter detects no interference between the saw blade and the first sharpening stone; a adjusting the position of the second sharpening stone until the sound meter detects interference between the saw blade and the second sharpening stone; and a adjusting the position of the second sharpening stone until the sound meter detects no interference between the saw blade and the second sharpening stone.

DETAILED DESCRIPTION

To overcome the limitations of the prior art and the present invention provides a sound level meter that may be removably coupled to a saw blade sharpening apparatus to aid in safe, reliable, reproducible and effective saw blade sharpening. The sound level meter is adapted to be removably attached to the saw blade sharpening apparatus and to provide accurate and reliable indication of interference between the saw blade and the saw blade sharpening stones. The sound level meter is capable of detecting interference even in the often noisy operating environment. After the sound level meter has been used to set up the proper interference between the saw blade and the sharpening stone, the sound level meter may be removed from the apparatus and stored to prevent damage or interfere with operation of the sharpening apparatus.

Embodiments of the present invention provide a sound level meter that accurately and efficiently quantify noise in a given area. The sound level meter may even be adapted for use in noisy areas that may otherwise have high degrees of background noise which may make detection of a specific sound difficult. As an example, individuals wishing to sharpen a saw blade in a noisy mill environment may use the sound level meter to detect the transient noise caused by interference between a saw blade and a sharpening stone, which may otherwise be difficult to detect against the ambient background noise of the mill environment.

Figure 1:
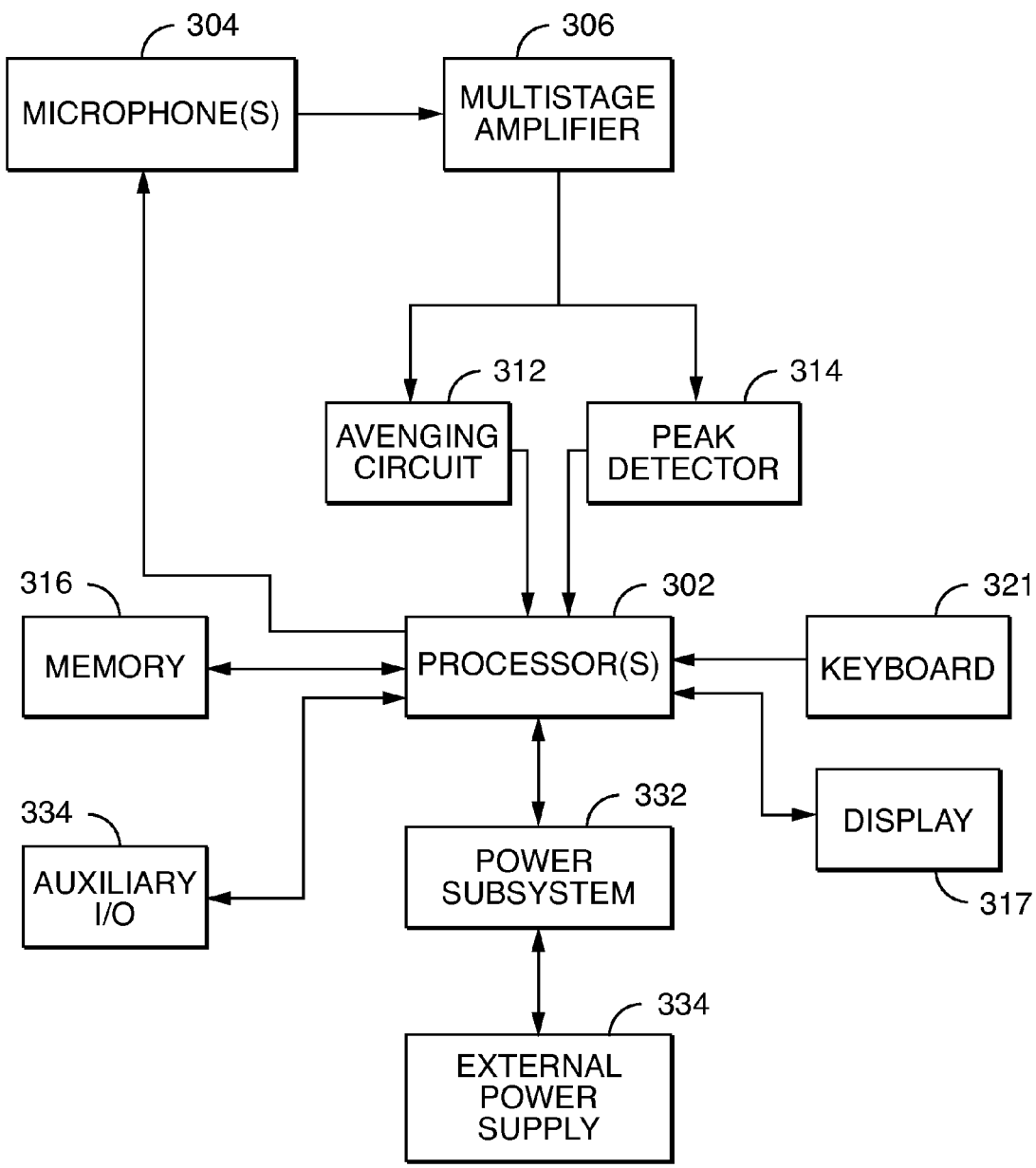
FIG. 1 s a block diagram illustrating a sound level meter according to one embodiment of the present invention.
Figure 2:
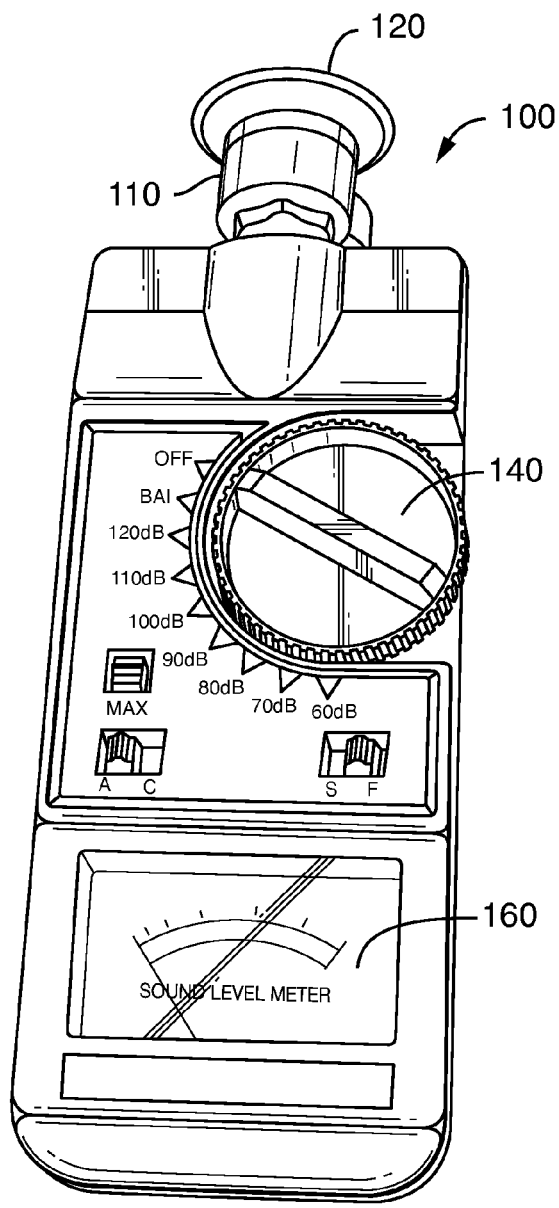
FIG. 2 is a top view of a sound level meter according to one embodiment of the present invention.

Referring to FIGS. 1-2, a sound level meter 100 of the present invention is shown. The sound level meter 1000 is unique in that the sound level meter 1000 comprises a mounting mechanism 190 for removably mounting the sound level meter 100 to a blade sharpening apparatus. In a particularly preferred embodiment, such as that illustrated in FIG. 2, the mounting mechanism 190 lies in substantially the same vertical plane as the microphone 120. In this manner, when the sound meter 100 is mounted to a saw blade sharpening apparatus the microphone 120 is brought in close proximity to the saw blade minimizing the amount of ambient noise and increasing the sensitivity of the meter.

The sound level meter 100 has a body 102. In the illustrated embodiment the body 102 is rectangular in shape. However, this should not be seen as to limit the scope of the invention. The body 102 may come in other shapes without departing from the spirit and scope of the present invention. The body 102 is generally made out of a lightweight but sturdy material. For example, the body 102 may be made out of a material such as plastic, a lightweight aluminum, or the like. The listing of the above should not be seen as to limit the scope of the present invention. The body 102 may be of a single unit construction or may be formed from multiple parts. In a particularly preferred embodiment the body 102 has a first end 103, a second end 104, a top surface 105 and a bottom surface 106.

The top surface 105 of the body 102 may have a first opening formed therein and adapted to receive a display screen 160. A second opening may also be formed in the top surface 105 of the body 102 to receive a control toggle 140.

In the embodiment illustrated in FIG. 2, coupled to and extending out of a bottom surface 106 of the body 102 is a mounting mechanism 190. In the illustrated embodiment, the mounting mechanism 190 comprises a shaft 192 having a first 194 and second 196 end. The first end 194 is coupled to the body 102 by a threaded fastening member of the like. The second end 196 has a fastener 198 disposed thereon for removably attaching the sound level meter 100 to a saw blade sharpening apparatus. As illustrated, in a one embodiment the second end 196 of the shaft 192 extends slightly beyond the vertical plane of first end 103 of the body 102. In this manner the sound level meter 100 may be removably attached to a saw blade sharpening apparatus without the body 102 contacting the apparatus.

In the illustrated embodiment the fastener 198 is a magnet, although other fasteners known in the art, such as a strap, a clamp, a suction cup or a threaded member, may be used to removably attach the sound level meter 100 to a saw blade sharpening apparatus. In other embodiments the fastener may comprise more than one type of fastener known if the art. For example the fastener may comprise a suction cup and a magnet.

Extending out of the first end 103 of the body 102 is microphone 120. In certain embodiments the microphone may be contained within a cylindrical housing extending from the first end of the body. The housing is used to protect the microphone from damage. The housing has an opening in the top surface allowing the microphone to accurately monitor the sound level.

As illustrated in FIG. 1-2 in one embodiment the microphone 120 is surrounded by an acoustic shield 110. The acoustic shield 110 peripherally shields the microphone 120, but allows the passage of sound waves through its open end 112.

The microphone receives sound waves, which are converted into electrical signals. In certain embodiments the microphone is coupled to a sound measuring circuit and a calibration circuit by switch. The calibration circuit may be an internal oscillator. When activated, the internal oscillator will send a signal of a predefined frequency and sound level for electrical calibration of the sound level meter. The display will then display the level of the calibration signal. If the display shows a value that differs from the calibration signal, one needs to adjust the calibration dial until the desired value appears on the display.

The sound measuring circuit takes the sound signals from the microphone and converts it to digital signals which are sent to a processor unit. In certain embodiments the sound measuring circuit has an amplifier that increases the strength of the electrical signals passing through it. In a particularly preferred embodiment a second amplifier is coupled to the output of the first amplifier. The second amplifier is an adjustable amplifier. The adjustable amplifier is used with the calibration circuit. If the display shows a value that differs from the calibration signal, one needs to adjust the adjustable amplifier until the desired value appears on the display. A filter is coupled to the output of the second amplifier and used to clear up the output signal from the second amplifier. The output signal from the filter then is sent to an RMS value detection circuit.

In certain embodiments the sound level meter employs two standard detector response characteristics known as "F" (for Fast) and "S" (for Slow). The RMS value detection circuit allows for sound measurements to be made at the site and then level range set in consideration of the full measurement time. The output signal from the RMS value detection circuit is sent to an A/D converter. The A/D converter converts the analog signal from the RMS value detection circuit to a digital output signal. The digital signal from the A/D converter is sent to a processor that matches the digital signal output from the A/D converter with a measurement level and sends the measurement level to a display.

Figure 3:
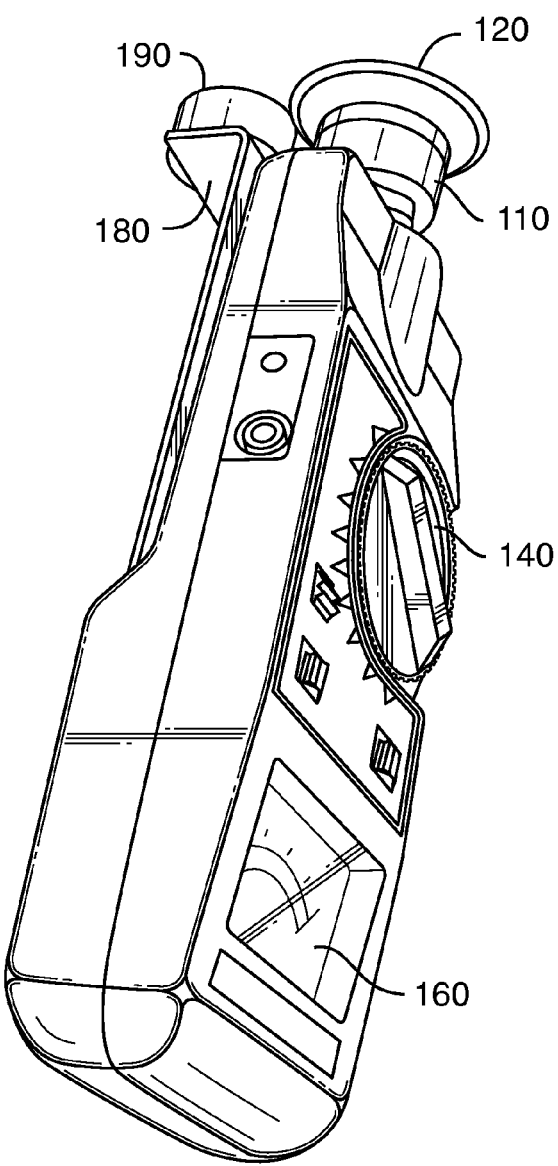
FIG. 3 is a perspective view of a sound level meter according to one embodiment of the present invention.

In a particularly preferred embodiment the sound level meter comprises both an ambient measuring circuit and a transient measuring circuit, as illustrated in FIG. 3, so as to enable satisfactory operation in areas with a high degree ambient noise. As shown in FIG. 3, in one embodiment the sound level meter 300 comprises one or more processors 302. One or more microphones 304 are electrically coupled to the processor 302 and a multi-stage amplifier 306 that provides a large dynamic range. In this embodiment, the microphone 304 can be relatively small in size, low cost and have a flat response for the bandwidth from about 300 Hz to about 4 kHz. However, microphones with other characteristics can be used as well.

The multi-stage amplifier 306 receives the output of the microphone 304. In this embodiment, the multi-stage amplifier 306 comprises a +30 dB preamp followed by four +15 dB amplification stages, providing selectable gains of 30 to 85 dB. However, this is not meant to be limiting and other configurations of the multi-stage amplifier 306 are also applicable. The multi-stage amplifier 306 is electrically coupled to an ambient measuring circuit 308 and a transient measuring circuit 310. Each of these circuits 308 and 310 receives the output of the multi-stage amplifier 306. The ambient measuring circuit 308 comprises an averaging circuit 312 with a heuristically determined range, such as a 5-minute time constant. The transient measuring circuit 310 comprises a peak detector 314 that counts the number of events that exceeds a given threshold, which can be determined dynamically or statically. The outputs of the ambient measuring circuit 308 and the transient measuring circuit 310 are received by the processor 302.

A battery 330 is connected to a power subsystem 332 to provide power to the circuits of the device 300. The power subsystem 332 includes power distribution circuitry for providing power to the device 300 and also contains battery charging circuitry to manage the recharging of the battery 330. An external power supply 334 is able to be connected to an external power connection 336.

Operating system software used by the processor 302 is stored in a memory (not illustrated). In this embodiment, a flash memory stores the operating system software and other executable programs, while further embodiments use a battery backed-up RAM or other non-volatile storage elements. The operating system software, device application software, or parts thereof, are able to be temporarily loaded into volatile data storage within the memory.

The saw blade sharpening apparatus to which this invention applies are widely used in conjunction with the rewinding of paper webs to develop toilet tissue and toweling. The log saws operated to transversely sever the wound log into retail size lengths. The log saw includes a frame through which a log is advanced along a path and transversely severed into retail size rolls. Typically the log saw frame contains a log saw blade which is sharpened by a pair of sharpening stones, grinding wheels or the like are generally referred to herein as sharpening means.

In the present invention it is to be understood sharpening apparatus and sharpening refer to apparatus and processes wherein a cutting blade blank is initially ground to produce desired surfaces (e.g. cutting side surface, clearance side surface, top surface, front cutting face, etc.) and edge conditions (e.g. cutting edge, clearance edge, etc.) thereon as well as those instances where existing cutting blade surfaces are ground to restore the desired surface geometry and edge conditions (i.e. sharpening).

Figure 4:
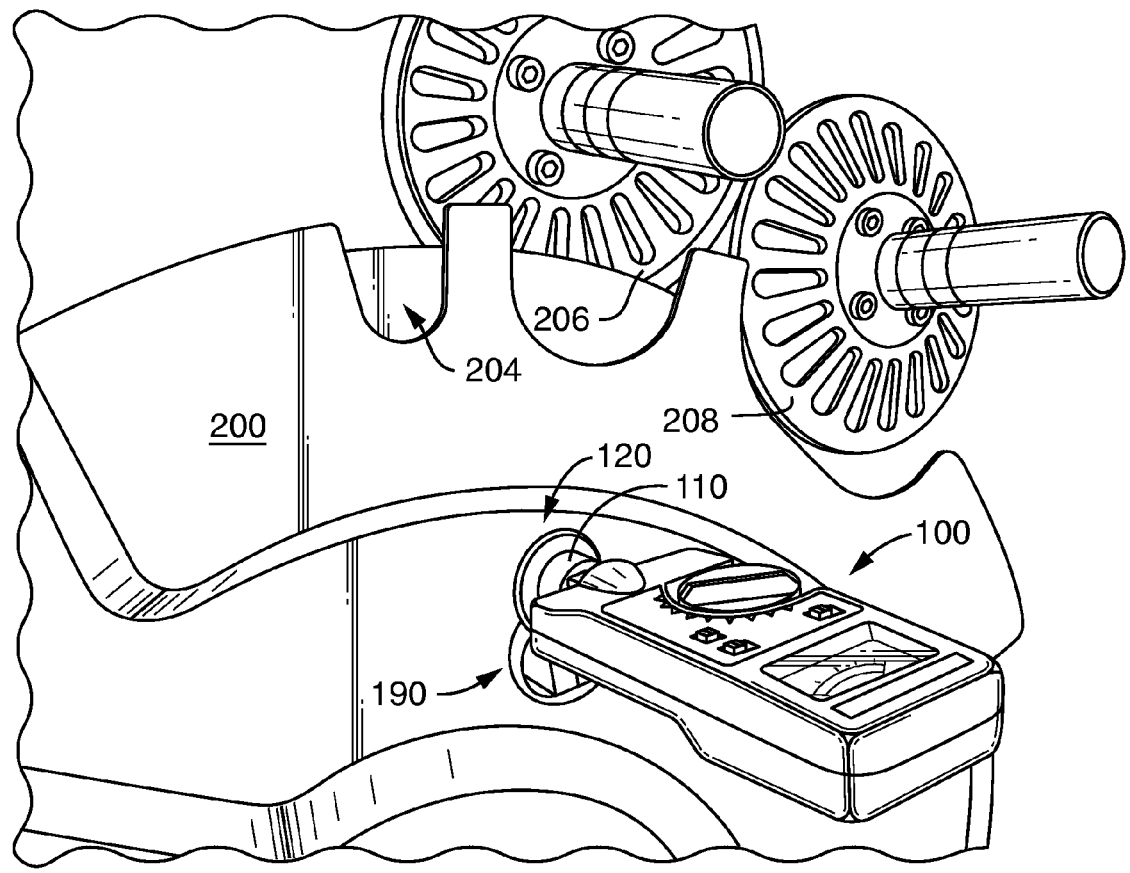
FIG. 4 illustrates a sound level meter according to one embodiment of the present invention coupled to a saw blade sharpening apparatus in-use.

One embodiment of a saw blade sharpening apparatus useful in the present invention is illustrated in FIG. 4. In the illustrated embodiment the saw blade sharpening apparatus comprises a pair of sharpening stones 206, 208 (a first sharpening stone 206 and a second sharpening stone 208). The sharpening stones 206, 208 collectively form a means for sharpening a saw blade 204. In certain embodiments the sharpening stones 206, 208 are inclined so as to give an approximately cutting edge of the saw blade 204. Typically the sharpening stones 206, 208 are inclined in an opposite directions. The sharpening stones 206, 208 are rotatable about their own axes and both radially and axially relative to the saw blade 204. The sharpening stones 206, 208 may be mounted to a subframe (not illustrated), the position of which may be adjusted vertical by an adjustment means, such as a hand-wheel or the like. By turning the adjustment means the subframe and the sharpening stones 206, 208 attached thereto are moved radially relative to the saw blade 204 to adjust for wear of the sharpened periphery. Further, each of the sharpening stones 206, 208 may be rotatably mounted within the subframe and a connected to a drive system for delivering rotational power to the sharpening stones 206, 208.

The sharpening stones 206, 208 may be driven from the same drive as that which drives the associated saw blade 204 This substantially reduces both the weight and the space requirements while achieving high efficiency not only as far as blade sharpness is concerned but also the fact that the blades are sharpenable during the portion of each orbit when they are not cutting, and without the need for stopping the blade in a particular section of the orbit. Through the use of air pressure the sharpening stones 206, 208 are loaded against mechanical stops and apply equal pressure on the saw blade 204.

With further reference to FIG. 4, the saw blade sharpening apparatus further comprises a guard 200. The guard 200 is arranged to overlie the saw blade 204 and prevent contact between the user and the blade. In certain embodiments the guard may be hinged so that it can be swung back to give access to the saw blade. Further the guard may include cut outs so as to allow contact between the saw blade 204 and the sharpening stones 206, 208.

The saw blade sharpening apparatus illustrated in FIG. 4 is configured for sharpening and has a sound meter 100 of the present invention attached thereto. As illustrated in FIG. 4 the sound meter 100 is attached to the guard 200 by a magnet 190 disposed at one end of the sound meter 100. As noted above, other attachment means are contemplated. Similarly, other points of attachment of the sound meter to the sharpening apparatus are contemplated, such as the subframe supporting the sharpening stones. The sound meter 100 is positioned and configured so as detect interference between the sharpening stones 206, 208 and the saw blade 204. As such the microphone 120 is brought in close proximity to the saw blade 206 minimizing the amount of ambient noise and increasing the sensitivity of the meter. Further, in the illustrated embodiment the microphone 120 is surrounded by an acoustic shield 110 that further reduces ambient noise and enhances detection of interference between the saw blade 204 and the sharpening stones 206, 208.

Once the sound level meter 100 is attached to the sharpening apparatus, such my affixing the magnet 190 to the guard 200 the saw blade 204 is positioned for sharpening by rotating the saw blade 204 and contacting the saw blade 204 with the sharpening stones 206, 208. Contact between the saw blade 204 with the sharpening stones 206, 208 may be controlled by moving the saw lade 204 or by moving the sharpening stones 206, 208 or both. In certain embodiments each of the sharpening stones 206, 208 may be supported by a respective sharpening stone cartridge which facilitates the ready removal and replacement of the sharpening stones and allows the stones to be moved in a variety of directions.

Once the sound level meter 100 has been installed by attaching the meter to the sharpening apparatus via the attachment means 190 the sound level meter 100 is switched on and the decibel range is selected by rotating the control toggle 140. In particularly preferred embodiment the a decibel range from about 80 to about 90 db is selected. In other embodiments, once the decibel range is selected "A/C weighting" may be selected by toggling the appropriate switch to "A" and the "SLOW/FAST" is switched to "FAST." With the sound level meter 100 attached and operational, the first stone 206 is adjusted to engage the saw blade 204 until sound meter display 160 registers a level. The first stone 206 is then adjusted slowly until sound meter display 160 no longer registers a level. Once no sound is registered the process is repeated for the second stone 208. The sound meter 100 is then removed from the apparatus and sharpening commences.

What we claim is:

1. A method of sharpening a saw blade comprising the steps of:
   a. providing a saw blade sharpening apparatus comprising a saw blade, at least one sharpening stone and a frame;
   b. providing a mountable sound level meter;
   c. mounting the sound level meter on the saw blade sharpening apparatus; and d. adjusting the position of at least one sharpening stone until the sound meter detects interference between the saw blade and the sharpening stone.

2. The method of claim 1 wherein the mountable sound level meter comprises a housing; a microphone; a processor coupled to the microphone; a display coupled to the processor; and a mounting mechanism for removably mounting the sound level meter to a blade sharpening apparatus.

3. The method of claim 1 wherein the saw blade sharpening apparatus further comprises a guard.

4. The method of claim 3 wherein the step of mounting the sound level meter comprises mounting the sound level meter to the guard.

5. The method of claim 1 wherein the saw blade sharpening apparatus comprises two sharpening stones.

6. The method of claim 5 further comprising the step of adjusting the position of a second sharpening stone until the sound meter detects interference between the saw blade and the second sharpening stone.

7. A method of sharpening a saw blade comprising the steps of:
   a. providing a saw blade sharpening apparatus comprising a saw blade, a first and a second sharpening stone, a saw blade guard and a frame;
   b. providing a mountable sound level meter comprising a microphone, a housing, a display and a magnet;
   c. magnetically mounting the sound level meter on the saw blade guard;
   d. an adjusting the position of the first sharpening stone until the sound meter detects interference between the saw blade and the first sharpening stone;
   e. an adjusting the position of the first sharpening stone until the sound meter detects no interference between the saw blade and the first sharpening stone;
   f. an adjusting the position of the second sharpening stone until the sound meter detects interference between the saw blade and the second sharpening stone; and
   g. an adjusting the position of the second sharpening stone until the sound meter detects no interference between the saw blade and the second sharpening stone.

8. The method of claim 1 wherein mountable sound level meter comprises a housing; a microphone; a processor coupled to the microphone; a display coupled to the processor; and a mounting mechanism for removably mounting the sound level meter to a blade sharpening apparatus.

9. The method of claim 8 wherein mountable sound level meter further comprising an acoustic shield surrounding the microphone.

10. The method of claim 8 wherein the mounting mechanism comprises a clamp, a strap, a suction cup, a magnet or a threaded member.

11. The method of claim 8 wherein the microphone and the mounting mechanism lie in substantially the same vertical plane.

12. The method of claim 8 wherein the housing has a top, a bottom, a first end and a second end, and wherein the display is disposed on the top, the mounting mechanism is disposed on the bottom, and the microphone is disposed on the first end.

13. The method of claim 8 wherein the mounting mechanism comprises a shaft having a first and a second end, the first end coupled to the bottom of the housing and a magnet disposed on the second end.

14. The method of claim 8 wherein the mountable sound level meter further comprising an ambient measuring circuit and a transient measuring circuit for generating a plurality of signals each representing an amplitude of sound occurring within a given environment.

* * * * *